United States Patent
Fryer

(10) Patent No.: US 10,227,892 B2
(45) Date of Patent: Mar. 12, 2019

(54) FUEL FLOW DIVIDER VALVE MOUNTING ARRANGEMENT FOR A GAS TURBINE ENGINE

(71) Applicant: PRATT & WHITNEY CANADA CORP., Longueuil (CA)

(72) Inventor: Michael Fryer, Oakville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 15/920,872

(22) Filed: Mar. 14, 2018

(65) Prior Publication Data

US 2018/0202318 A1 Jul. 19, 2018

Related U.S. Application Data

(62) Division of application No. 15/138,350, filed on Apr. 26, 2016, now Pat. No. 9,951,649.

(51) Int. Cl.

| *F16M 11/00* | (2006.01) |
|---|---|
| *F01D 25/04* | (2006.01) |
| *F01D 25/24* | (2006.01) |
| *F02C 7/32* | (2006.01) |
| *F02C 7/232* | (2006.01) |

(52) U.S. Cl.
CPC .......... *F01D 25/04* (2013.01); *F01D 25/243* (2013.01); *F02C 7/232* (2013.01); *F02C 7/32* (2013.01); *F05D 2220/32* (2013.01); *F05D 2260/31* (2013.01); *F05D 2260/38* (2013.01); *F05D 2260/96* (2013.01)

(58) Field of Classification Search
CPC ........................................................ F16F 15/08
See application file for complete search history.

(56) References Cited

U.S. PATENT DOCUMENTS

| 3,315,316 | A | 4/1967 | Baney et al. | |
|---|---|---|---|---|
| 4,200,256 | A | 4/1980 | Thiel | |
| 4,584,928 | A * | 4/1986 | Haynes | F16F 1/50 123/195 R |
| 4,690,365 | A | 9/1987 | Miller et al. | |
| 5,460,351 | A | 10/1995 | Holloway | |
| 5,709,516 | A | 1/1998 | Peterson et al. | |
| 5,743,509 | A * | 4/1998 | Kanda | F16F 1/38 248/634 |
| 7,849,696 | B2 | 12/2010 | De Sousa et al. | |
| 8,454,290 | B2 | 6/2013 | Schaser et al. | |
| 8,510,945 | B2 * | 8/2013 | Hand | F02K 1/822 248/638 |
| 9,273,749 | B2 | 3/2016 | Goold et al. | |
| 9,739,338 | B2 * | 8/2017 | Hattori | F16F 15/08 |
| 2008/0226419 | A1 | 9/2008 | Holt et al. | |
| 2013/0343876 | A1 | 12/2013 | LeBlanc et al. | |

\* cited by examiner

*Primary Examiner* — Amy J. Sterling
(74) *Attorney, Agent, or Firm* — Norton Rose Fulbright Canada LLP

(57) ABSTRACT

A valve mount comprises a first mounting plate securable to an existing part of a gas turbine engine, a second mounting plate secured to a valve, and at least a pair of fastener assemblies on opposed sides of the valve for securing the first and second mounting plates together. A vibration isolator is disposed between the first and second mounting plates to absorb some of the energy that is being transferred from the valve to the structure of the engine during a predetermined operating phase of the engine.

17 Claims, 4 Drawing Sheets

FUEL FLOW DIVIDER VALVE MOUNTING ARRANGEMENT FOR A GAS TURBINE ENGINE

RELATED APPLICATION

This application is a divisional of U.S. patent application Ser. No. 15/138,350 filed on Apr. 26, 2016, the content of which is hereby incorporated by reference.

TECHNICAL FIELD

The application relates generally to gas turbine engines and, more particularly, to a mounting adapter for mounting a fuel flow divider valve to an engine casing.

BACKGROUND OF THE ART

When incorporating new designed parts with existing hardware, it is sometimes necessary to provide an adapter to facilitate the attachment of the existing part to the new part. In most situations, this results in an arrangement that meets the overall project requirements.

However, depending on the prevailing operating conditions, factors such as the natural frequency of the new assemblies interacting with the systems various operating dynamic modes may compromise component and system durability. When faced with such a situation, it is necessary to change the response of the system. This can be achieved a number of ways that may result in a more intrusive approach causing redesign of some of the major system components.

SUMMARY

In one aspect, there is provided a fuel flow divider valve mounting arrangement for a gas turbine engine, comprising a valve body and an adapter, the adapter comprising a first mounting plate securable to an engine casing of the gas turbine engine, a second mounting plate disposed opposite to the first mounting plate and secured to the valve body, and damped fastener assemblies securing the first and second mounting plates together, each damped fastener assembly including a first set of Belleville washers trapped between the first and second mounting plates.

In another aspect, there is provided a valve mount for a gas turbine engine, comprising a first mounting plate securable to an existing part of a gas turbine engine, a second mounting plate secured to a valve, at least a pair of fastener assemblies on opposed sides of the valve for securing the first and second mounting plates together, and a vibration isolator disposed between the first and second mounting plates.

In a further aspect, there is provided a method of mounting a fuel flow divider valve to a gas generator case of a gas turbine engine, the method comprising: mounting a first plate to the gas generator case, mounting a second plate to the fuel flow divider valve, providing a vibration isolator between the first and second plates and clamping the first and second plates together.

DESCRIPTION OF THE DRAWINGS

Reference is now made to the accompanying figures in which.

DETAILED DESCRIPTION

Figure 1:
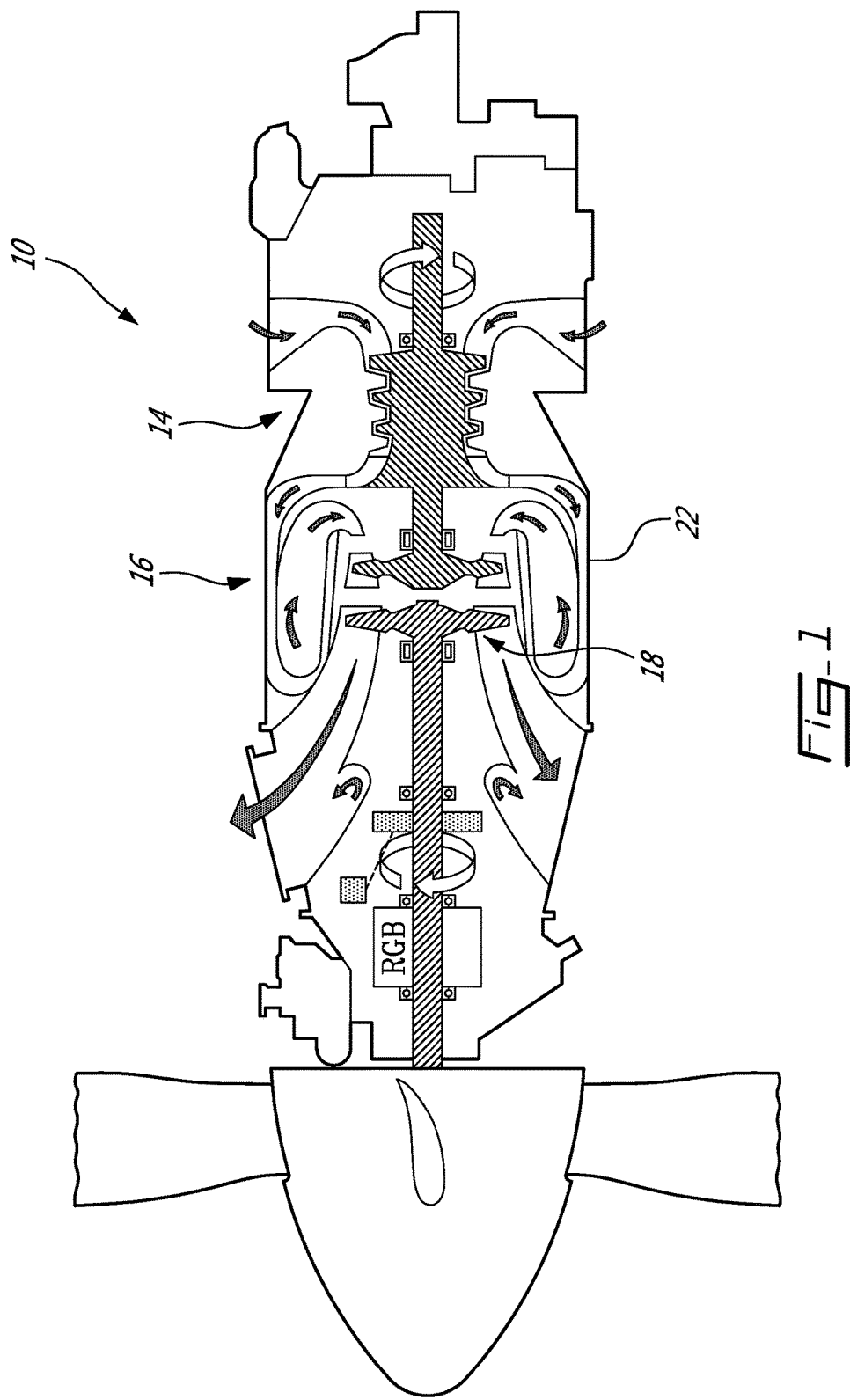
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
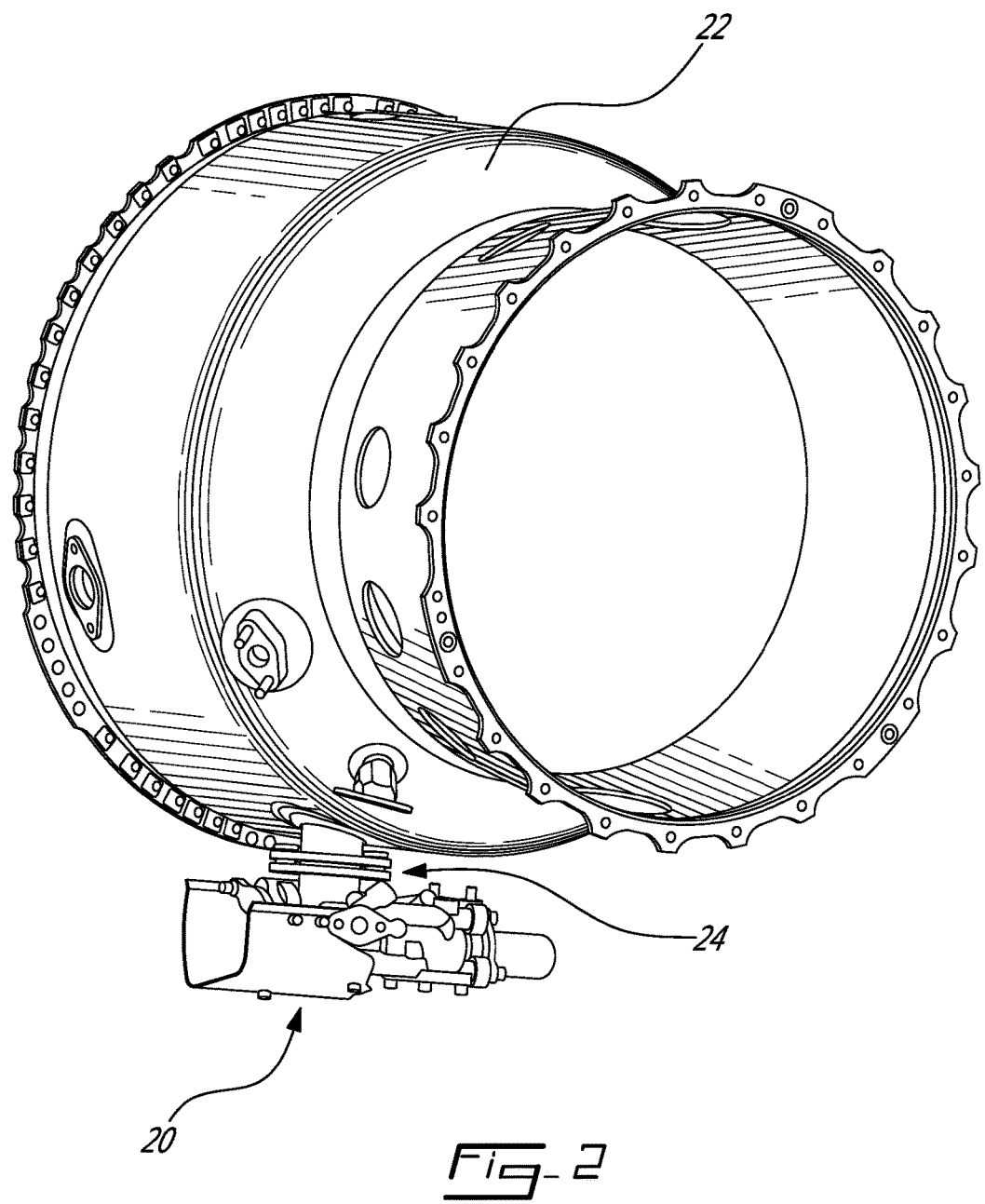
FIG. 2 is an isometric view of a flow divider valve mounted to a gas generator case of the engine shown in FIG. 1.

FIG. 2 illustrates a fuel flow divider valve 20 mounted to a boss at the bottom of a gas generator case 22 of the engine 10. The flow divider valve 20 is used to distribute primary and secondary fuel to the primary and secondary fuel feed lines of a fuel manifold (not shown) forming part of the fuel distribution system of the engine 10. Applicant has observed that during some stages of operation of the system, as for instance at a certain point during the start-up cycle of the engine, the fuel flow divider valve 20 is excited in such a way as to induce undue stresses around the boss of the gas generator case 22, which stresses could compromise the low cycle fatigue (LCF) life of the gas generator case 22. To reduce the impact of the fuel flow divider valve 20 on the case 22, it is herein proposed to use a damped adapter 24 to absorb at least part of the fuel flow divider valve excitement and, thus, reduce the amount of stresses transferred to the gas generator case 22.

Figure 3:
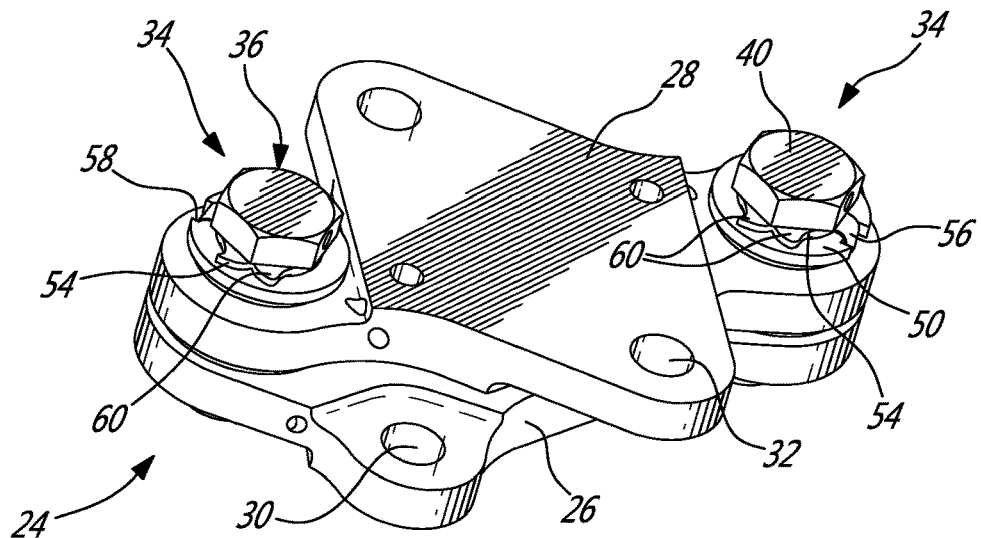
FIG. 3 is an isometric view of a damped adapter suitable for mounting the flow divider valve to the gas generator case of the engine.
Figure 4:
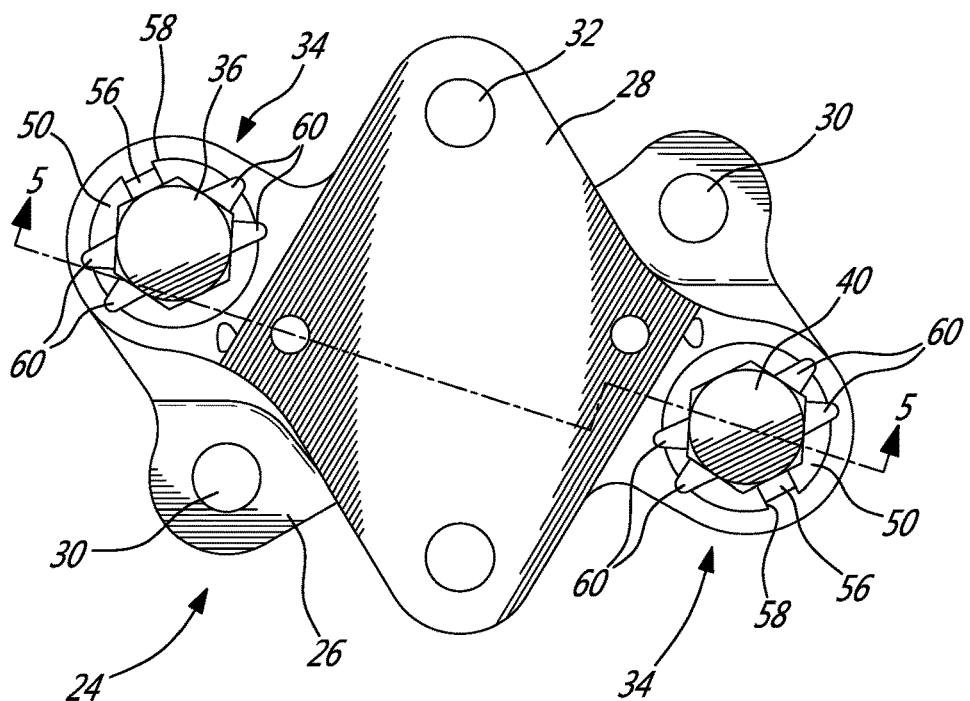
FIG. 4 is a top view of the damped adapter shown in FIG. 3.
Figure 5:
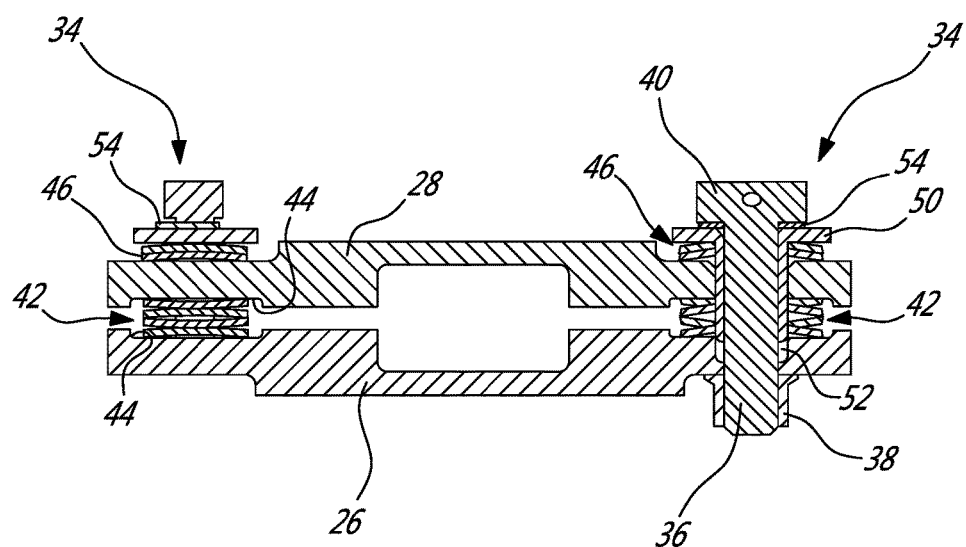
FIG. 5 is a cross-section view taken along line A-A in FIG. 4.

FIGS. 3 to 5 illustrate a non-limiting embodiment of such a damped adapter for mounting at the interface between the flow divider valve 20 and the gas generator case 22. It is understood that the adapter 24 could adopt various configurations depending on the size, shape and configuration of the valve and the gas generator case 22 or the other engine hardware to which it is mounted. As will be seen hereinafter, a vibration damper or isolator is integrated to the adapter 24 to provide vibration damping. In this way, a discreet approach to altering the dynamic response of the system can be achieved by replacing the standard rigid adapter with a damped adapter, such as the one shown in FIGS. 3 to 5. The damped adapter 24 introduces a damping characteristic that is able to absorb some of the dynamic energy that would otherwise be transferred by the standard rigid adapter to the system.

The adapter 24 generally comprises a first mounting plate 26 adapted to be mounted to the gas generator case 22 and a second mounting plate 28 opposite to the first mounting plate 26 and configured for mounting to the fuel flow divider valve 20. The first and second mounting plates 26, 28 are provided with respective mounting holes 30, 32 matching corresponding mounting holes on the gas generator case 22 and the fuel flow divider valve 20 for receiving suitable fasteners, such as bolts and nuts (not shown). According to the illustrated embodiment, a pair of damped fastener assemblies 34 is provided in diagonally opposed corners of the plates 26, 28. The valve 20 is, thus, mounted between the damped fastener assemblies 34.

As shown in FIG. 5, each fastener assembly 34 may comprise a bolt 36 extending through corresponding registering holes defined in the first and second mounting plates 26, 28. A nut 38 is tightened at a predetermined torque onto a distal end of the bolt 36 opposite the head 40 thereof. The vibration isolator may take the form of a first set of Belleville washers 42 disposed between the first and second mounting plates 26, 28 around the shank of the bolt 36. Alternatively, the vibration isolator could take the form of spiral spring washers, rubber or silicon members and the like. In the illustrated embodiment, the first set of Belleville washers 42 comprises a plurality (e.g. 4 washers) of Belleville washers disposed end-to-end to form a spring column around the bolt 36 between the plates 26, 28. The in-series formation is a means of multiplying the deflection of a single Belleville washer, the force required to compress the washers remaining that of a single spring. The in-line arrangement thus provides for greater amplitude of movement between the first and second mounting plates 26, 28.

As can be appreciated from FIG. 5, the first set of Belleville washers 42 can be received in recessed seats 44 defined in the inwardly facing surface of the first and second mounting plates 26, 28. The torque applied to the nut 38 and the Belleville washers 42 are calibrated to maintain a predetermined gap between the first and second mounting plates 26, 28 when the valve mount is not excited.

A second set of Belleville washers 46 may be provided to maintain the bolt 36 under tension when the first and second plates 26, 28 are squeezed and the first set of Belleville washers 42 is compressed, and to provide damping for the rebound when the valve mounting plate 28 move away from the first plate 26 attached to the gas generator case 22. The second set of Belleville washers 46 may be disposed between the head 40 of the bolt 36 and the outer side of the second mounting plate 28 (i.e. the valve mounting plate). According to the illustrated example, the second set of Belleville washers 46 comprises at least two Belleville washers nested into each other. The nested configuration allows multiplying the stiffness of the spring formation by the number of springs. According to the illustrated example, the stiffness of the second set of Belleville washers 46 is thus doubled.

A guide sleeve 50 may be positioned around the bolt 36 between the head 40 and the nut 38 to more precisely control the concentricity of the first and second sets of Belleville washers 42, 46. The guide sleeve 50 can be manufactured to fairly accurate tolerances to keep the Belleville washers aligned properly. The guide sleeve 50 is sized to be pressure fitted in the associated hole of the second mounting plate 28. The registering hole in the first mounting plate 26 is sized to slidably receive the distal end of the sleeve 50 to permit the plates 26, 28 to move towards and away from each other. This can be clearly seen in FIG. 5 where the hole 52 in the first mounting plate 26 is enlarged on a portion of the length thereof to slidably accommodate the distal end of the sleeve 50.

As best shown in FIGS. 3 and 4, a lock washer 54 may be disposed underneath the head 40 of the bolt 36. The washer 54 may be provided with a first anti-rotation tab 56 that can be plastically deformed in a corresponding groove 58 defined in the periphery of a flange extending from an adjacent end of the guide sleeve 50. The guide sleeve 50 is itself prevented from rotating relative to the second mounting plate 28 by virtue of the tight fit engagement existing therebetween. The washer 54 further has opposed pairs of anti-rotation tabs 60 that can be bent upwardly for engagement with the hexagonal head 40 of the bolt 36. The engagement of the first anti-rotation tab 56 in groove 58 and of tabs 60 with the head 36 of the bolt 40 prevents loosening of the bolt connection and, thus, ensures the preservation of the original nominal loading of the Belleville washers 42, 46.

In operation, during the engine start-up phase, the fuel flow divider valve 20 gets excited. The vibrations from the valve are at least partly absorbed by the isolator (e.g. the Belleville washers) integrated to the adaptor 24, thereby reducing the transmission of stresses from the valve 20 to the gas generator case 22. The isolator is calibrated to specifically damp a predetermined frequency range. In case of Belleville washers, care must be exerted at torqueing in order not to under or over torque the Belleville washers. If the Belleville washers are under torque, they will not provide their full damping capacity. On the other hand, if they are over torque, their damping properties will be destroyed.

The above description is meant to be exemplary only, and one skilled in the art will recognize that changes may be made to the embodiments described without departing from the scope of the invention disclosed. For example, while the present invention has been described in the context of a fuel pressure valve mounting arrangement, it is understood that similar principals could be used to isolate a new piece of equipment from an existing structure to which the new part is to be mounted. Still other modifications which fall within the scope of the present invention will be apparent to those skilled in the art, in light of a review of this disclosure, and such modifications are intended to fall within the appended claims.

The invention claimed is:

1. A valve mount for a gas turbine engine, comprising a first mounting plate securable to an existing part of a gas turbine engine, a second mounting plate secured to a valve, the valve separated from the gas turbine engine by the first mounting plate and the second mounting plate, at least a pair of fastener assemblies outwardly disposed on opposed sides of the valve for securing the first and second mounting plates together, and a vibration isolator disposed outside of the valve between the first and second mounting plates, wherein the fastener assemblies are isolated and independent of both the existing part of the gas turbine engine and the valve.

2. The valve mount of claim 1, wherein the vibration isolator is selected from a group consisting of: Belleville washers, nested wave springs, and rubber or silicon pads.

3. The valve mount of claim 2, wherein each fastener assembly comprises a fastener extending through registering holes in the first and second mounting plates, and wherein the vibration isolator includes a first set of Belleville washers disposed around the fastener of each fastener assembly.

4. The valve mount of claim 3, wherein the first set of Belleville washers includes a plurality of Belleville washers disposed end-to-end to form a spring column around the fastener of each fastener assembly.

5. The valve mount of claim 3, further comprising a second set of Belleville washers around the fastener of each fastener assembly outboard of the first and second mounting plates and holding the fastener in tension when the first and second mounting plates are squeezed.

6. The valve mount of claim 5, wherein the fastener includes a bolt and a nut tightened onto an end of the bolt opposite a head thereof, and wherein a guide sleeve is disposed around the bolt between the head and the nut, the first and second sets of Belleville washers being concentrically disposed around the guide sleeve.

7. The valve mount of claim 5, wherein the second set of Belleville washers includes at least two washers nested into each other.

8. The valve mount of claim 6, further comprising a washer disposed underneath the head of the bolt, the washer having a first anti-rotation tab for engagement in groove defined in the guide sleeve, the washer further having a plurality of second anti-rotation tabs for engagement with the head of the bolt.

9. The valve mount of claim 8, wherein the guide sleeve is locked against rotation relative to the first and second mounting plates.

10. A method of mounting a fuel flow divider valve to a gas generator case of a gas turbine engine, the method comprising: mounting a first plate to the gas generator case, mounting a second plate to the fuel flow divider valve, providing a vibration isolator between the first and second plates and using fasteners clamping the first and second plates together, the fasteners being isolated and independent of both the gas generator case and the fuel flow divider valve.

11. The method of claim 10, wherein providing a vibrator isolator comprises providing a first set of Belleville washers between the first and second plates.

12. A valve mount for a gas turbine engine, comprising:
   a first mounting plate securable to an existing part of a gas turbine engine;
   a second mounting plate secured to a valve, the valve separated from the gas turbine engine by the first mounting plate and the second mounting plate;
   at least a pair of fastener assemblies outwardly disposed on opposed sides of the valve for securing the first and second mounting plates together, wherein at least one of the pair of fastener assemblies comprises a fastener extending through registering holes in the first and second mounting plates, a guide sleeve fitted on the fastener, and a washer disposed underneath a head of the fastener, the washer having a first anti-rotation tab for engagement in a groove defined in the guide sleeve, the washer further having a plurality of second anti-rotation tabs for engagement with the head of the fastener; and
   a vibration isolator disposed outside of the valve between the first and second mounting plates, wherein the vibration isolator includes a first set of Belleville washers concentrically disposed around the guide sleeve.

13. The valve mount of claim 12, wherein the first hset of Belleville washers includes a plurality of Belleville washers disposed end-to-end to form a spring column around the fastener of the at least one fastener assembly.

14. The valve mount of claim 12, further comprising a second set of Belleville washers around the fastener of the at least one fastener assembly outboard of the first and second mounting plates and holding the fastener in tension when the first and second mounting plates are squeezed.

15. The valve mount of claim 14, wherein the fastener includes a bolt and a nut tightened onto an end of the bolt opposite a head thereof.

16. The valve mount of claim 14, wherein the second set of Belleville washers includes at least two washers nested into each other.

17. The valve mount of claim 12, wherein the guide sleeve is locked against rotation relative to the first and second mounting plates.

* * * * *